(12) United States Patent
Park et al.

(10) Patent No.: US 11,650,779 B2
(45) Date of Patent: May 16, 2023

(54) INFINITELY EXPANDABLE DISPLAY APPARATUS AND DRIVING METHOD THEREOF

(71) Applicant: LG Display Co., Ltd., Seoul (KR)

(72) Inventors: Dae Hyeon Park, Seoul (KR); Tae Gung Kim, Goyang-si (KR); Sun Cheol Noh, Incheon (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/522,659

(22) Filed: Nov. 9, 2021

(65) Prior Publication Data

US 2022/0188057 A1    Jun. 16, 2022

(30) Foreign Application Priority Data

Dec. 14, 2020  (KR) .......................... 10-2020-0174268

(51) Int. Cl.
*G06F 3/14*    (2006.01)
*G09G 3/3208*    (2016.01)

(52) U.S. Cl.
CPC .......... *G06F 3/1446* (2013.01); *G06F 3/1438* (2013.01); *G09G 3/3208* (2013.01); *G09G 2300/026* (2013.01); *G09G 2310/08* (2013.01); *G09G 2352/00* (2013.01); *G09G 2370/08* (2013.01); *G09G 2370/16* (2013.01)

(58) Field of Classification Search
CPC ... G06F 3/1446; G06F 3/1438; G09G 3/3208; G09G 2300/026; G09G 2310/08; G09G 2352/00; G09G 2370/08; G09G 2370/16

USPC ........................................................ 345/1.1
See application file for complete search history.

(56) References Cited

U.S. PATENT DOCUMENTS

| 6,501,441 | B1* | 12/2002 | Ludtke | H04N 21/4363 |
| | | | | 345/1.3 |
| 7,250,978 | B2* | 7/2007 | Lee | H04N 9/12 |
| | | | | 348/588 |
| 10,067,727 | B2* | 9/2018 | Leeman | G09G 3/006 |
| 2004/0201621 | A1* | 10/2004 | Stevens | G06F 3/1454 |
| | | | | 715/273 |
| 2007/0047505 | A1* | 3/2007 | Wassingbo | H04N 1/00127 |
| | | | | 370/338 |
| 2009/0096921 | A1* | 4/2009 | Katayama | H04N 21/47 |
| | | | | 348/E7.04 |
| 2010/0111491 | A1* | 5/2010 | Kamoto | H04N 5/073 |
| | | | | 386/207 |
| 2014/0306966 | A1* | 10/2014 | Kuo | G06F 3/1446 |
| | | | | 345/522 |

(Continued)

FOREIGN PATENT DOCUMENTS

| KR | 10-2008-0073495 A | 8/2008 |
| KR | 10-2012-0074517 A | 7/2012 |

(Continued)

*Primary Examiner* — Tom V Sheng
(74) *Attorney, Agent, or Firm* — Fenwick & West LLP

(57) ABSTRACT

An infinitely expandable display apparatus includes a set board outputting image data, a plurality of display devices connected to one another through an interface circuit based on a cascading scheme to sequentially receive the image data, and an output deviation compensation circuit generating a deviation compensation signal for allowing the image data to be simultaneously output from the plurality of display devices, and transferring the deviation compensation signal to the plurality of display devices.

20 Claims, 20 Drawing Sheets

(56) References Cited

U.S. PATENT DOCUMENTS

2017/0337881 A1* 11/2017 Zhang .................... G09G 3/36

FOREIGN PATENT DOCUMENTS

| KR | 10-2013-0056776 A | 5/2013 |
| KR | 10-1890656 B1 | 8/2018 |

* cited by examiner

| DIVISION | RESOLUTION | Remark |
| --- | --- | --- |
| | WIDTH x LENGTH | |
| Display Unit | 480 x 270 | ASIC DRIVING MINIMUM UNIT |
| Cabinet | 1,920 x 1,080 | SET DRIVING UNIT (16Unit) |

INFINITELY EXPANDABLE DISPLAY APPARATUS AND DRIVING METHOD THEREOF

CROSS-REFERENCE TO RELATED APPLICATION

This application claims the benefit of the Republic of Korea Patent Application No. 10-2020-0174268 filed on Dec. 14, 2020, which is hereby incorporated by reference in its entirety.

BACKGROUND

Field of Technology

The present disclosure relates to an infinitely expandable display apparatus capable of being expanded.

Discussion of the Related Art

Recently, large-size displays are being used in various fields such as indoor and outdoor digital advertisements. In order to satisfy the demands for large-size displays, infinitely expandable display apparatuses have been proposed. In the infinitely expandable display apparatuses, a single screen is configured by connecting a plurality of display units, and a screen size may increase depending on the case.

In the infinitely expandable display apparatuses, because the display units sequentially receive image data on the basis of a cascading scheme, an image reception time is progressively delayed in the display units. A deviation of an image output time between the display units occur due to the delay of image reception. As the number of display units configuring an infinitely expandable display apparatus increases, a deviation of an image output may increase, and image quality may be degraded.

SUMMARY

To overcome the aforementioned problem of the related art, the present disclosure may provide an infinitely expandable display apparatus and a driving method of the infinitely expandable display apparatus, in which an output time of image data matches between display devices which sequentially receive image data on the basis of a cascading scheme.

To achieve these objects and other advantages and in accordance with the purpose of the disclosure, as embodied and broadly described herein, an infinitely expandable display apparatus includes a set board outputting image data, a plurality of display devices connected to one another through an interface circuit based on a cascading scheme to sequentially receive the image data, and an output deviation compensation circuit generating a deviation compensation signal for allowing the image data to be simultaneously output from the plurality of display devices, and transferring the deviation compensation signal to the plurality of display devices.

In another aspect of the present disclosure, a driving method of an infinitely expandable display apparatus includes outputting image data by using a set board, sequentially receiving the image data by using a plurality of display devices connected to one another through an interface circuit based on a cascading scheme, generating a deviation compensation signal and transferring the deviation compensation signal to the plurality of display devices by using an output deviation compensation circuit, and simultaneously outputting the image data received from the plurality of display devices on the basis of the deviation compensation signal.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figures 1, 2:
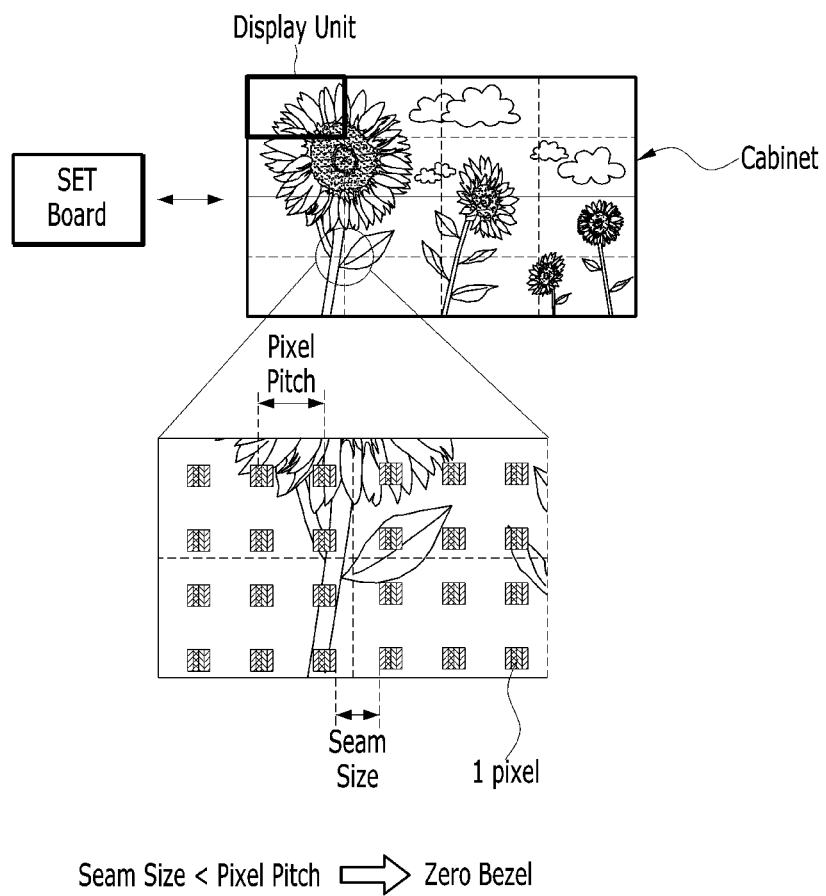
FIG. 1 is a diagram schematically illustrating an infinitely expandable display apparatus according to an embodiment of the present disclosure.
FIG. 2 is a diagram illustrating a resolution based on a unit of driving of the infinitely expandable display apparatus illustrated in FIG. 1 according to one embodiment.

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on~", "over~", "under~", and "next~", one or more other parts may be disposed between the two parts unless "just" or "direct" is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

Figure 3:
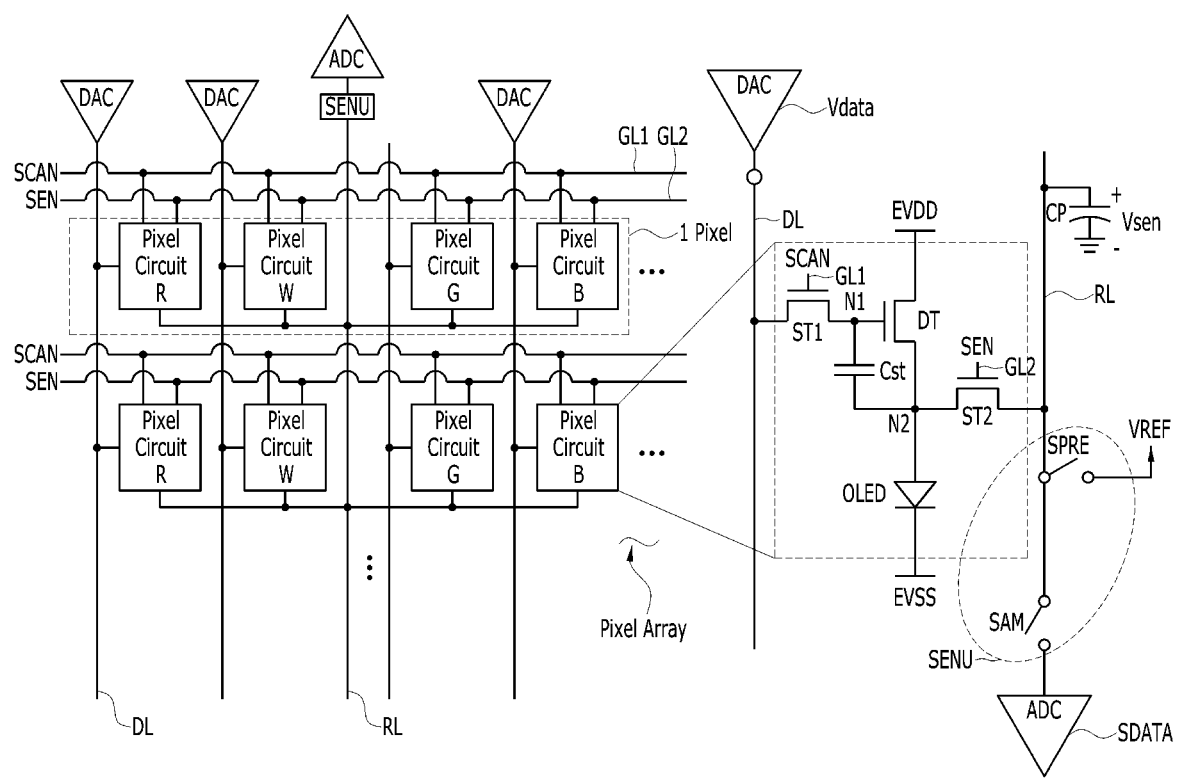
FIG. 3 is a diagram illustrating a configuration of a display unit in an infinitely expandable display apparatus according to one embodiment.
Figure 4:
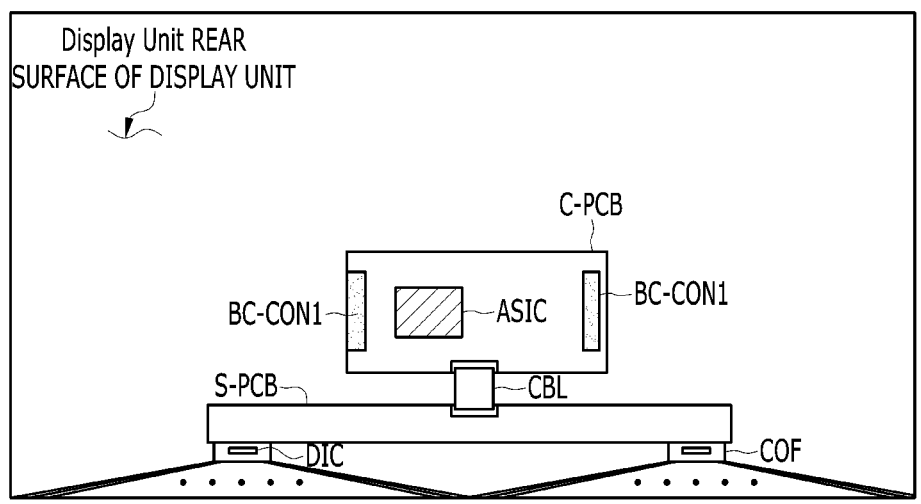
FIG. 4 is a diagram illustrating a configuration of a panel driving circuit of a display unit in an infinitely expandable display apparatus according to one embodiment.
Figure 5:
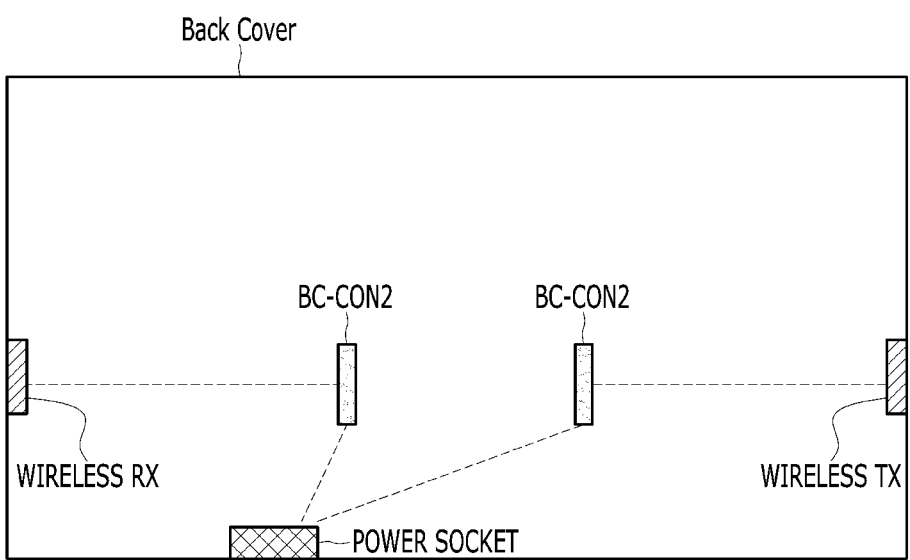
FIGS. 5 and 6 are diagrams illustrating a configuration of a back cover of a display unit in an infinitely expandable display apparatus according to one embodiment.
Figure 6:
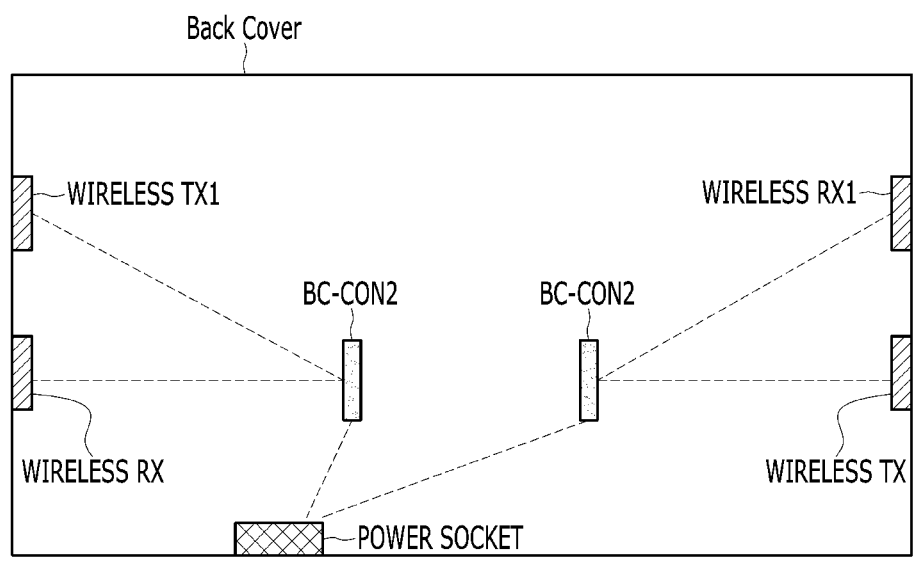

FIG. 1 is a diagram schematically illustrating an infinitely expandable display apparatus according to an embodiment of the present disclosure. FIG. 2 is a diagram illustrating a resolution based on a unit of driving of the infinitely expandable display apparatus illustrated in FIG. 1 according to an embodiment of the present disclosure. FIG. 3 is a diagram illustrating a configuration of a display unit in an infinitely expandable display apparatus according to an embodiment of the present disclosure. FIG. 4 is a diagram illustrating a configuration of a panel driving circuit of a display unit in an infinitely expandable display apparatus according to an embodiment of the present disclosure. Also, FIGS. 5 and 6 are diagrams illustrating a configuration of a back cover of a display unit in an infinitely expandable display apparatus according to an embodiment of the present disclosure.

The infinitely expandable display apparatus according to an embodiment of the present disclosure illustrated in FIG. 1 may include a set board and a cabinet.

The cabinet may include a plurality of display units connected to one another through an interface circuit, and thus, a large screen composed of the plurality of display units may be configured. A total resolution of the large screen may be determined as a total sum of unit resolutions of the display units. For example, as in FIG. 2, in a case where the cabinet is configured with sixteen display units having a unit resolution of 480*270, a total resolution of the cabinet may be 1920*1080.

The display units may be based on an electroluminescent display type or a liquid crystal display type, but the technical spirit of the present disclosure is not limited to an implementation type of a display unit. Hereinafter, for convenience of description, an example where a display unit is implemented as the electroluminescent display type will be mainly described in an embodiment of the present disclosure.

In order to realize a zero bezel, an interval (i.e., a seam size) between the display units in the cabinet may be designed to be less than an interval (i.e., a pixel pitch) between pixels. The visibility and readability of a screen may be improved by the zero bezel.

Display units may be connected to one another through an interface circuit based on a cascading scheme and may sequentially transfer image data generated by a set board. In order to reduce the complexity of a communication interface and the manufacturing cost, an interface circuit connecting display units may be implemented based on a wireless scheme. Here, the interface circuit may be a unidirectional interface circuit, or may be a bidirectional interface circuit.

Each of the display units may be an electroluminescent display apparatus which includes a display panel where a plurality of pixels are provided and a panel driving circuit for driving the display panel. The panel driving circuit may include an application specific integrated circuit (ASIC), a data driver, and a gate driver.

A pixel array illustrated in FIG. 3 may be formed in a front surface of a substrate of a display panel. A plurality of subpixels may be provided in the pixel array, and moreover, a plurality of signal lines for supplying a driving voltage to the plurality of subpixels may be disposed in the pixel array. The signal lines may include a plurality of data lines DL for transferring data voltages Vdata, a plurality of gate lines GL1 and GL2 for transferring gate signals SCAN and SEN, and a plurality of readout lines RL for supplying a reference voltage VREF and sensing a pixel driving characteristic Vsen. Also, the signal lines disposed in the pixel array may further include a driving voltage line for transferring a high level pixel voltage EVDD. In the pixel array, the data lines DL and the readout lines RL may be disposed to extend in a first direction, and the gate lines GL1 and GL2 may be disposed to extend in a second direction that intersects with the first direction. The signal lines may be connected to a pixel circuit of each subpixel and may be connected to a panel driving circuit. Also, a low level pixel voltage EVSS may be supplied to the pixel array. Here, the low level pixel voltage EVSS may be a common voltage which is applied to all of the subpixels. The low level pixel voltage EVSS may be applied as a higher voltage in a sensing mode for detecting a driving characteristic than a display mode for displaying an image.

A plurality of subpixels may configure one pixel. For example, red (R), white (W), green (G), and blue (B) subpixels adjacent to one another in the first direction may configure one pixel. Also, the R, G, and B subpixels may configure one pixel, and in this case, the W subpixel may be omitted in the pixel array. The R, W, G, and B subpixels may merely include different light emitting materials included in light emitting devices thereof and may have substantially the same as configurations of pixel circuits thereof.

Each of the subpixels, as shown in FIG. 3, may include a light emitting device OLED, a driving thin film transistor (TFT) DT, a plurality of switch TFTs ST1 and ST2, and a storage capacitor Cst. The driving TFT DT and the switch TFTs ST1 and ST2 may each be implemented as an NMOS transistor, but are not limited thereto.

The light emitting device OLED may be a light emitting device which emits light having intensity corresponding to a pixel current input from the driving TFT DT. The light emitting device OLED may be implemented as an organic light emitting diode including an organic light emitting layer, or may be implemented as an inorganic light emitting diode including an inorganic light emitting layer. An anode electrode of the light emitting device OLED may be connected to a second node N2, and a cathode electrode thereof may be connected to an input terminal for the low level pixel voltage EVSS.

The driving TFT DT may be a driving element which generates the pixel current on the basis of a gate-source voltage thereof. A gate electrode of the driving TFT DT may be connected to a first node N1, a first electrode (a drain electrode) may be connected to an input terminal of the high level pixel voltage EVDD, and a second electrode (a source electrode) may be connected to the second node N2.

The switch TFTs (for example, first and second switch TFTs) ST1 and ST2 may be switch elements which set the gate-source voltage and connect the second electrode of the driving TFT DT to the readout line RL.

The first switch TFT ST1 may be connected between the data line DL and the first node N1 and may be turned on based on a first gate signal SCAN applied through a first gate line GL1. The first switch TFT ST1 may be turned on in a setup operation in each of the display mode and the sensing mode. When the first switch TFT ST1 is turned on, a display or sensing data voltage Vdata may be applied to the first node N1. A gate electrode of the first switch TFT ST1 may be connected to the first gate line GL1, a first electrode thereof may be connected to the data line DL, and a second electrode thereof may be connected to the first node N1.

The second switch TFT ST2 may be connected between the readout line RL and the second node N2 and may be turned on based on a second gate signal SEN applied through a second gate line GL2. The second switch TFT ST2 may be turned on in the setup operation in each of the display mode and the sensing mode and may apply the reference voltage VREF to the second node N2. Also, the second switch TFT ST2 may be turned on in performing a sensing operation after the setup operation in the sensing mode and may transfer a source node voltage (or a source voltage) of the driving TFT DT to the readout line RL. Then, a sensing voltage Vsen corresponding to the source voltage may be stored in a parasitic capacitor Cp of the readout line RL. A gate electrode of the second switch TFT ST2 may be connected to the second gate line GL2, a first electrode thereof may be connected to the readout line RL, and a second electrode thereof may be connected to the second node N2.

The storage capacitor Cst may be connected between the first node N1 and the second node N2 and may hold the gate-source voltage of the driving TFT DT during a certain period. In the display mode, the gate-source voltage of the driving TFT DT may be set to a difference voltage between the display data voltage Vdata and the reference voltage VREF, and in the sensing mode, the gate-source voltage of the driving TFT DT may be set to a difference voltage between the sensing data voltage Vdata and the reference voltage VREF.

In the display mode, a pixel current corresponding to the gate-source voltage of the driving TFT DT may flow in the driving TFT DT, and the light emitting device OLED may emit light on the basis of the pixel current. In the sensing mode, the pixel current corresponding to the gate-source voltage of the driving TFT DT may flow in the driving TFT DT, and a source node voltage of the driving TFT DT may vary. The source node voltage may vary based on a driving characteristic of the driving TFT DT, and thus, a driving characteristic variation of the driving TFT DT may be detected based on the sensing voltage Vsen corresponding to the source node voltage. In the sensing mode, the low level pixel voltage EVSS may be applied to be higher than an operation point voltage of the light emitting device OLED, and thus, the pixel current of the driving TFT DT may not flow to the light emitting device OLED and may flow to only the readout line RL. Accordingly, the source node voltage may be reflected as the sensing voltage Vsen in an early time, and thus, sensing reliability may increase.

A configuration and an operation of the subpixel are merely an embodiment, and the technical spirit of the present disclosure is not limited thereto. For example, the first and second gate signals SCAN and SEN may be provided as one signal, and the first and second gate lines GL1 and GL2 may be provided as one signal. Also, the configuration of the subpixel may be designed based on a double rate driving scheme.

An ASIC, as in FIG. 4, may be mounted on a control printed circuit board C-PCB and may be disposed on a rear surface of the substrate of the display panel. The control printed circuit board C-PCB may be connected to a source printed circuit board S-PCB through a connection cable CBL. A conductive film COF with a data driver DIC mounted thereon may be bonded to the source printed circuit board S-PCB. Accordingly, the ASIC may be electrically connected to the data driver DIC, and a signal supply path may be formed therebetween. The control printed circuit board C-PCB may include a first connection terminal BC-CON1. The first connection terminal BC-CON1 may be connected to a second connection terminal BC-CON2 provided in a back cover of FIGS. 5 and 6.

One signal reception terminal wireless RX and one signal transfer terminal wireless TX may be installed in the back cover of FIG. 5 so that a unidirectional interface circuit based on a wireless scheme is implemented. The signal reception terminal wireless RX may be wirelessly connected to the signal transfer terminal wireless TX included in a neighbor display unit. Also, the signal transfer terminal wireless TX may be wirelessly connected to the signal reception terminal wireless RX included in another neighbor display unit. The second connection terminal BC-CON2 may be electrically connected to a power socket and may be further connected to the signal reception terminal wireless RX and the signal transfer terminal wireless TX through an internal cable. The power socket may be supplied with an input power from the outside. The input power supplied to the power socket may be supplied to the signal reception terminal wireless RX and the signal transfer terminal wireless TX through the internal cable. Also, the input power supplied to the power socket may be supplied to the ASIC through the first and second connection terminals BC-CON1 and BC-CON2 and may be further supplied to a power circuit. The power circuit may be mounted on the control printed circuit board C-PCB and may process the input power to generate an operation voltage of the data driver DIC, an operation voltage of a gate driver, and operation voltages EVDD and VREF of a pixel. Various operation voltages generated by the power circuit may be supplied to the data driver DIC through the connection cable CBL and the source printed circuit board S-PCB.

Two signal reception terminals wireless RX and wireless RX1 and two signal transfer terminals wireless TX and wireless TX1 may be installed in the back cover of FIG. 6 so that a bidirectional interface circuit based on the wireless scheme is implemented. The signal reception terminal wireless RX may be wirelessly connected to the signal transfer terminal wireless TX included in a neighbor display unit, and the signal transfer terminal wireless TX may be wirelessly connected to the signal reception terminal wireless RX included in another neighbor display unit. Also, the signal reception terminal wireless RX1 may be wirelessly connected to the signal transfer terminal wireless TX1 included in a neighbor display unit, and the signal transfer terminal wireless TX1 may be wirelessly connected to the signal reception terminal wireless RX1 included in another neighbor display unit. The second connection terminal BC-CON2 may be electrically connected to a power socket and may be further connected to the signal reception terminals wireless RX and wireless RX1 and the signal transfer terminals wireless TX and wireless TX1 through an internal cable. The input power supplied to the power socket may be supplied to the signal reception terminals wireless RX and wireless RX1 and the signal transfer terminals wireless TX and wireless TX1 through the second connection terminal BC-CON2 and the internal cable. Also, the input power supplied to the power socket may be supplied to the ASIC through the first and second connection terminals BC-CON1 and BC-CON2 and may be further supplied to a power circuit. The power circuit may be mounted on the control printed circuit board C-PCB and may process the input power to generate an operation voltage of the data driver DIC, an operation voltage of a gate driver, and operation voltages EVDD and VREF of a pixel. Various operation voltages generated by the power circuit may be supplied to the data driver DIC through the connection cable CBL and the source printed circuit board S-PCB.

The bidirectional interface circuit may be activated in a first transfer direction, and then, may be activated in a second transfer direction opposite to the first transfer direction. While the bidirectional interface circuit is being activated in the first transfer direction, the second connection terminal BC-CON2 in the back cover of FIG. 6 may be connected to the signal reception terminal wireless RX and the signal transfer terminal wireless TX through the internal cable. On the other hand, while the bidirectional interface circuit is being activated in the second transfer direction, the second connection terminal BC-CON2 in the back cover of FIG. 6 may be connected to the signal reception terminal wireless RX1 and the signal transfer terminal wireless TX1 through the internal cable.

Image data output from the set board may be transferred from a neighbor display unit to the signal reception terminal wireless RX. The image data transferred to the signal reception terminal wireless RX may be supplied to the ASIC through the internal cable and the first and second connection terminals BC-CON1 and BC-CON2. The ASIC may process the image data into unit image data on the basis of a unit resolution of the display panel, and then, the unit image data may be stored in a memory. Also, the ASIC may supply image data, remaining after processing, to the signal transfer terminal wireless TX through the internal cable and the first and second connection terminals BC-CON1 and BC-CON2. Then, the signal transfer terminal wireless TX may transfer the image data, remaining after the processing, to another neighbor display unit.

The ASIC may supply the data driver DIC with the unit image data, obtained through processing based on the unit resolution, and timing control signals synchronized with the unit image data through the signal supply path.

The data driver DIC may include a digital-analog converter DAC which generates the data voltage Vdata, a sensing circuit SENU, and an analog-digital converter ADC. In the display mode, the digital-analog converter DAC may convert the image data supplied from the ASIC to generate the display data voltage Vdata on the basis of a timing control signal and may supply the display data voltage Vdata to the data lines DL. In the sensing mode, the digital-analog converter DAC may generate a predetermined sensing data voltage Vdata and may supply the sensing data voltage Vdata to the data lines DL.

In the display mode, the sensing circuit SENU may supply the reference voltage VREF to the readout lines RL. In the sensing mode, the sensing circuit SENU may supply the reference voltage VREF to the readout lines RL and may sample the sensing voltage Vsen charged into the readout lines RL. The sensing circuit SENU may include a reference voltage switch SPRE, connected between the readout line RL and a reference voltage VREF input terminal, and a sampling switch SAM connected between the readout line RL and the analog-digital converter ADC. The reference voltage switch SPRE may be turned on in only a setup period of the display mode/sensing mode, and the sampling switch SAM may be turned on in only a sampling period of the sensing mode.

The analog-digital converter ADC may digital-process a sampling voltage, generated when the sampling switch SAM is turned on in the sensing mode, to output sensing result data SDATA. The sensing result data SDATA may be the execution result signal based on the driving command signal.

The gate driver may receive an operation voltage and a timing control signal through the data driver DIC. The gate driver may be embedded into a non-display area outside the pixel array of the display panel. The data driver may generate the first and second gate signals SCAN and SEN on the basis of the timing control signal and may supply the first and second gate signals SCAN and SEN to the first and second gate lines GL1 and GL2. In the display mode, the first and second gate signals SCAN and SEN may be for selecting a pixel line to which the display data voltage Vdata is to be applied, and in the sensing mode, the first and second gate signals SCAN and SEN may be for selecting a sensing target pixel line. Here, a pixel line may denote a set of signal lines and pixels adjacent to one another in the second direction.

The output deviation compensation circuit may be embedded into the set board or one of the display units. The output deviation compensation circuit may compensate for output latency occurring between the display units which sequentially receive image data by using the cascading scheme, on the basis of a deviation compensation signal, and thus, an output time of the image data may match between the display units.

Figure 7:
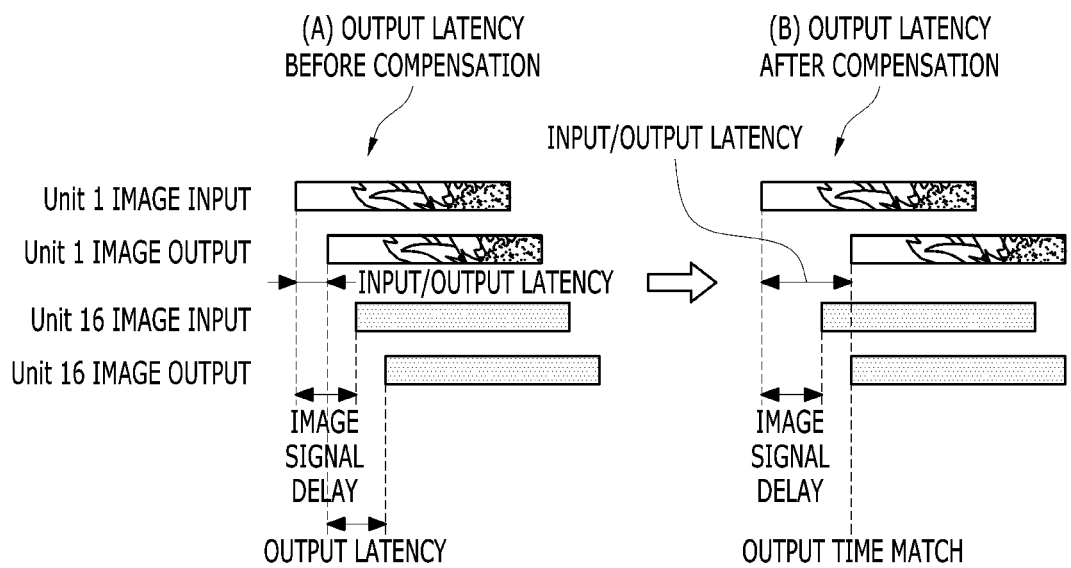
FIG. 7 is a diagram illustrating an example where image output times of display units match therebetween by compensating for output latency according to one embodiment.

FIG. 7 is a diagram illustrating an example where image output times of display units match therebetween by compensating for output latency. Also, FIG. 8 is a diagram schematically illustrating a compensation operation performed on output latency.

Referring to FIG. 7, when sixteen display units (for example, first to sixteenth display units) configure a cabinet, output latency equal to a delay time of image data may occur between the first display unit and the sixteenth display unit (see (A) of FIG. 7). At this time, the output deviation compensation circuit may delay an output time of image data of the first display unit by output latency to allow image output times of the first and sixteenth display units to match therebetween (see (B) of FIG. 7).

Figure 8:
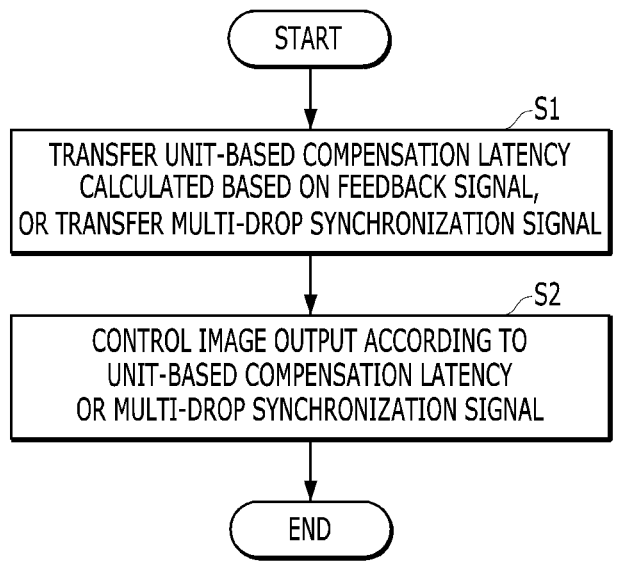
FIG. 8 is a diagram schematically illustrating a compensation operation performed on output latency according to one embodiment.

To this end, as in FIG. 8, an output deviation compensation circuit according to a first embodiment may calculate unit-based compensation latency on the basis of a feedback signal input from one of the display units and may transfer the calculated unit-based compensation latency as a deviation compensation signal to the display units (S1). Then, each display unit may control an image output on the basis of the unit-based compensation latency (S2). Therefore, image output times of the display units may match therebetween. Various embodiments associated with the output deviation compensation circuit according to the first embodiment will be described below with reference to FIGS. 9 to 23.

Moreover, an output deviation compensation circuit according to a second embodiment may calculate a predetermined multi-drop synchronization signal on the basis of a deviation compensation signal to the display units (S1). Then, each display unit may control an image output on the basis of the multi-drop synchronization signal (S2). Therefore, image output times of the display units may match therebetween. An example associated with the output deviation compensation circuit according to the second embodiment will be described below with reference to FIGS. 24 to 26.

Figure 9:
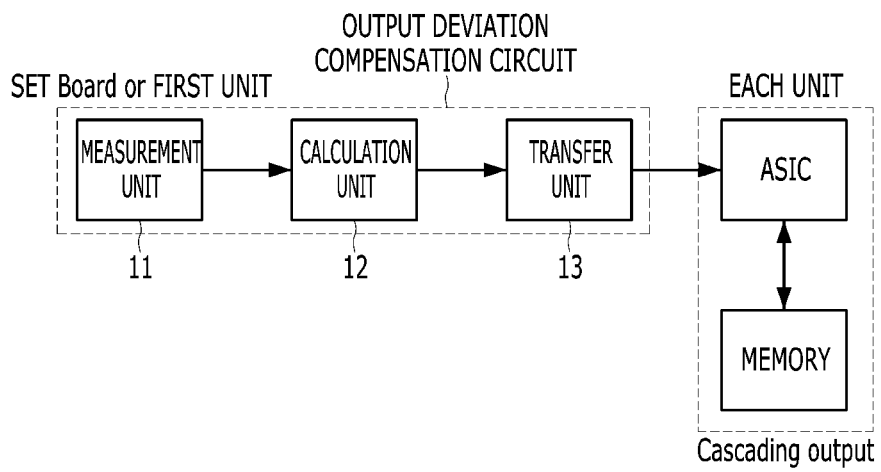
FIG. 9 is a diagram for describing an output deviation compensation circuit according to a first embodiment of the present disclosure.

FIG. 9 is a diagram for describing an output deviation compensation circuit according to a first embodiment of the present disclosure.

Referring to FIG. 9, the output deviation compensation circuit according to the first embodiment may include a measurement unit 11, a calculation unit 12, and a transfer unit 13.

The measurement unit 11 may receive a synchronization signal, in which total latency of display units is reflected, from one of the display units though feedback and may calculate the total latency on the basis of a feedback synchronization signal. The total latency may be a total time for which an image is delayed when image data is sequentially transferred up to a last display unit from a first display unit on the basis of the cascading scheme.

The calculation unit 12 may calculate, as a deviation compensation signal, display unit-based compensation latency for compensating for an output deviation between the display units on the basis of the total latency. The compensation latency may be differently calculated for each display unit. The compensation latency may be calculated to be largest in the first display unit and may be calculated to be smallest in the last display unit.

The transfer unit 13 may transfer the display unit-based compensation latency to the display units through an interface circuit based on the cascading scheme. The display unit-based compensation latency may be allocated to be differentiated from image data in a transfer data packet. The display unit-based compensation latency may be transferred to each display unit along with the image data, and thus, an additional interface line may not be needed and the manufacturing cost may be reduced.

An ASIC of each display unit may store unit image data, allocated thereto, of image data in a memory, and then, may read out the unit image data stored in the memory on the basis of the compensation latency and may control an operation of each of the gate driver and the data driver on the basis of a timing control signal based on the compensation latency to apply the readout unit image data to the display panel.

Figure 10:
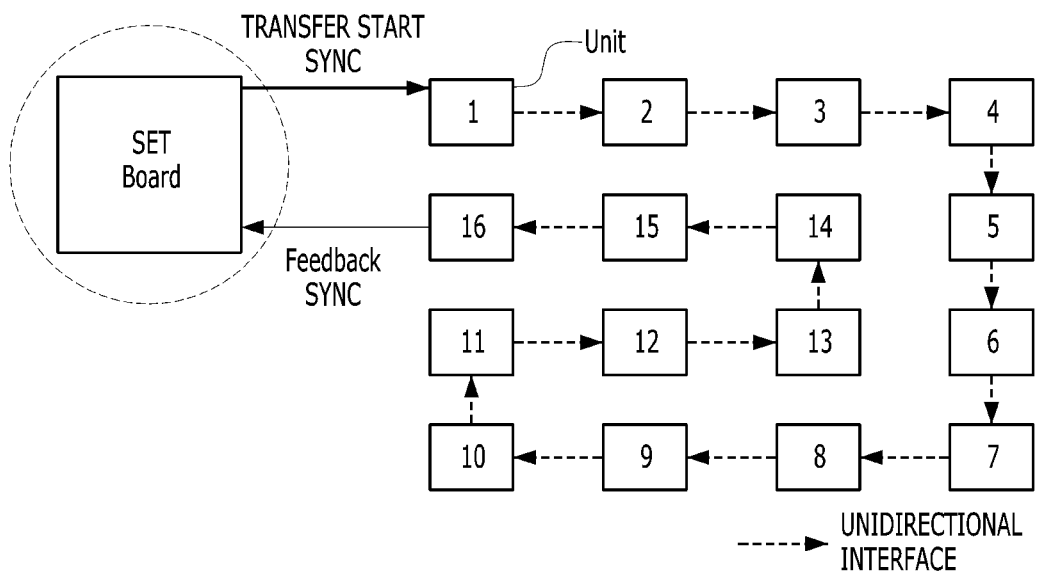
FIG. 10 is a diagram illustrating an example where the output deviation compensation circuit is embedded into a set board and receives, through feedback, a synchronization signal from a last display unit connected to a unidirectional interface circuit according to the first embodiment of the present disclosure.

FIG. 10 is a diagram illustrating an example where the output deviation compensation circuit according to the first embodiment of the present disclosure is embedded into a set board and receives, through feedback, a synchronization signal from a last display unit connected to a unidirectional interface circuit.

In an infinitely expandable display apparatus of FIG. 10, a plurality of display units may be connected to one another by using a unidirectional communication scheme based on the cascading scheme. A transfer data packet (including image data and a transfer start synchronization signal SYNC) transferred from a set board through a set interface circuit may be sequentially transferred and delayed in a first transfer direction based on a cascading order up to a display unit 16 from a display unit 1. According to the unidirectional communication scheme in the first transfer direction, the first display unit 1 may be a first display unit, a display unit 2 may be a second display unit, and the last display unit 16 may be a last display unit. In FIG. 10, serial numbers for differentiating the display units may represent a reception order of transfer data packets. The last display unit 16 may feed back a feedback synchronization signal SYNC, in which total latency is reflected, to the set board through the set interface circuit.

According to such a unidirectional communication scheme, each display unit may include one signal reception terminal (see wireless RX of FIG. 5) and one signal transfer terminal (see wireless TX of FIG. 5), and thus, a communication interface between the display units may be simplified and the manufacturing cost may decrease. Also, when a communication interface between display units is implemented as a short-distance wireless communication scheme, the simplification effect and convenience of screen expansion may increase. The short-distance wireless communication scheme may be implemented as an infrared scheme, but the present embodiment is not limited thereto.

Because each display unit includes one signal reception terminal wireless RX and one signal transfer terminal wireless TX so that the unidirectional communication scheme is implemented, the first display unit 1 and the last display unit 16 based on the cascading scheme may differ. The first display unit 1 and the last display unit 16 may be disposed closer to the set board than the other display units, for an effective communication connection with the set board.

The set board is connected to the first display unit 1 and the last display unit 16 through the set interface circuit. An output deviation compensation circuit including the measurement unit, the calculation unit, and the transfer unit may be embedded into the set board. The transfer unit of the set board may transfer the transfer start synchronization signal SYNC to the first display unit 1 through a first communication line included in the set interface circuit. The measurement unit of the set board may transfer the feedback synchronization signal SYNC to the last display unit 16 through a second communication line included in the set interface circuit. The measurement unit of the set board may calculate, as total latency, a time difference between the transfer start synchronization signal SYNC and the feedback synchronization signal SYNC as in FIG. 12. To this end, the measurement unit of the set board may include a timer as in FIG. 13 and may operate the timer in synchronization with an output of the transfer start synchronization signal SYNC (S11 and S12). The measurement unit may increase a count value of the timer until the feedback synchronization signal SYNC is received and may stop an operation of the timer when the feedback synchronization signal SYNC is received (S13 and S14). The measurement unit may calculate, as total latency, a count value until the feedback synchronization signal SYNC is received (S15). Here, the transfer start synchronization signal SYNC and the feedback synchronization signal SYNC may each be a vertical synchronization signal associated with image data, or may be a data enable signal associated with the image data. Then, as in FIG. 13, the calculation unit of the set board may calculate compensation latency by units of one display unit on the basis of the total latency (S16). Also, as in FIG. 13, the transfer unit of the set board may transfer a transfer data packet, including the compensation latency, to the first display unit 1 through the first communication line of the set interface circuit (S17).

Figure 14:
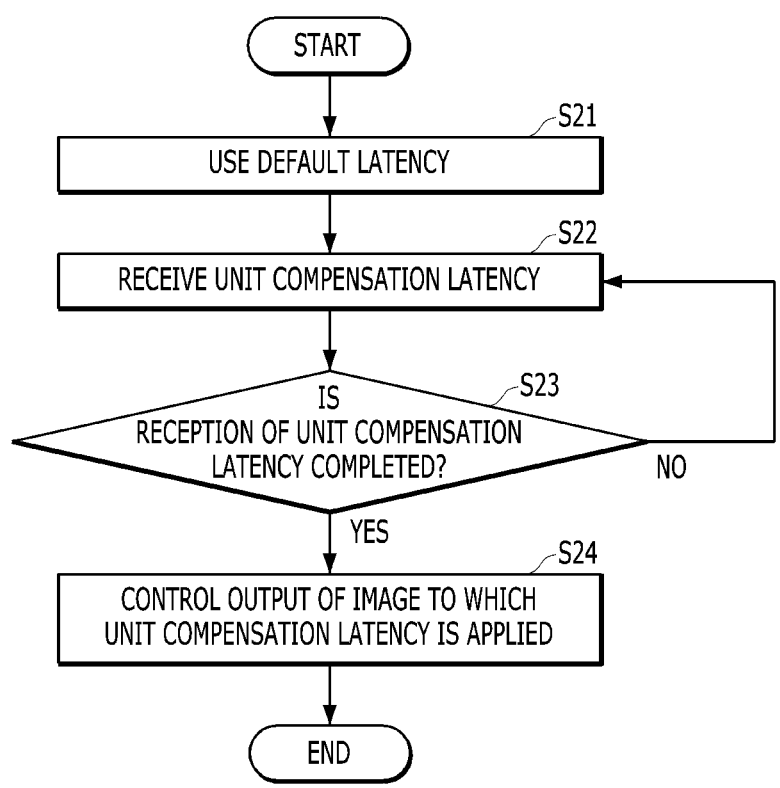
FIG. 14 is a diagram illustrating an operation of each display unit, according to the first embodiments of FIGS. 10 and 11.

The display units 1 to 16 may store unit image data in a memory on the basis of default latency until display unit-based compensation latency is received as in FIG. 14 (S21). When the display unit-based compensation latency is received as in FIG. 14, the display units 1 to 16 may apply the display unit-based compensation latency to control an image output (S22, S23, and S24). In other words, the display units 1 to 16 may read out the unit image data from the memory on the basis of the display unit-based compensation latency and may apply the unit image data to the display panel.

The set interface circuit may be implemented to be wired or wireless. When a separation distance between the set board and the cabinet is short, the set board and the cabinet may be connected to each other through a wireless interface circuit instead of a wired communication cable. Because the second communication line and the unidirectional interface circuit connecting display units configure a feedback loop line, closed loop control may be implemented with only an interface which is simple and is low in cost.

A set interface circuit and a unidirectional interface circuit may be implemented based on a V-by-One (V×1) scheme capable of high-speed and large-capacity interfacing, but are not limited thereto. The set interface circuit may be replaced with another serial communication scheme (for example, serial peripheral interface (SPI), I2C, controller area network (CAN), and universal asynchronous receiver/transmitter (UART)).

Figure 11:
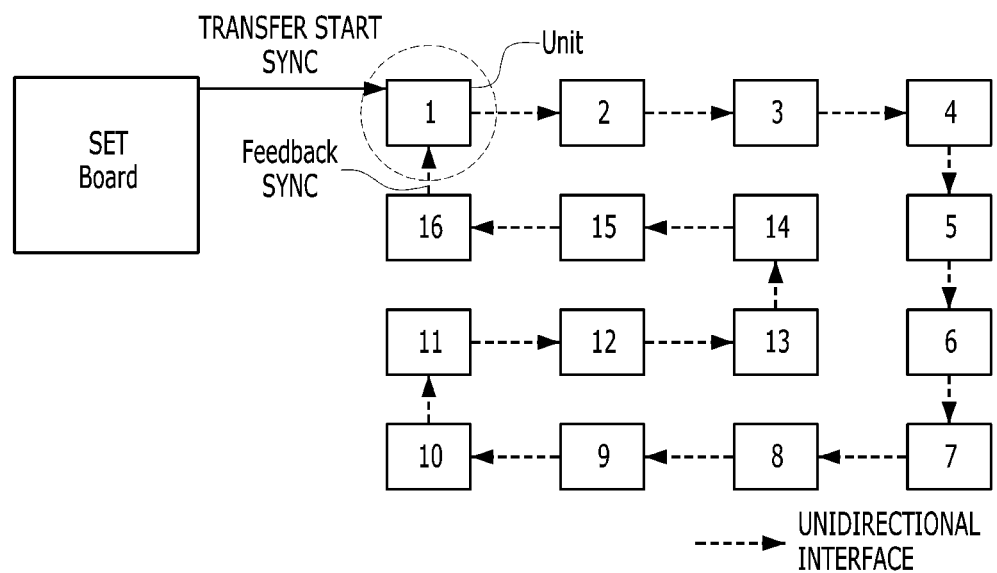
FIG. 11 is a diagram illustrating an example where the output deviation compensation circuit is embedded into a first display unit and receives, through feedback, a synchronization signal from a last display unit connected to a unidirectional interface circuit according to the first embodiment of the present disclosure.
Figure 12:
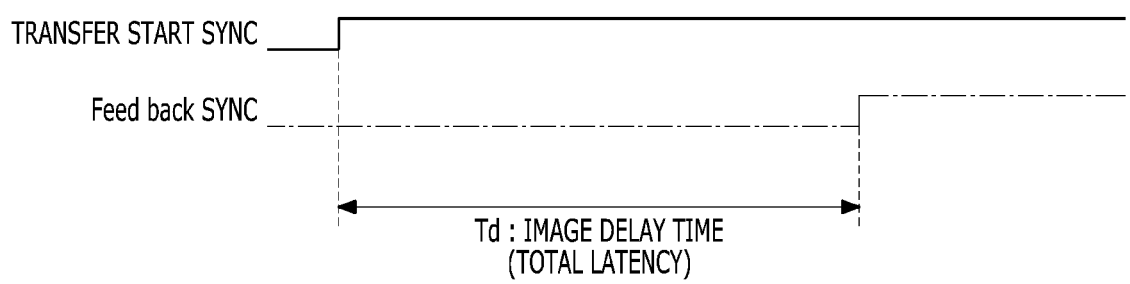
FIG. 12 is a diagram illustrating an image delay time between a transfer start synchronization signal and a feedback synchronization signal, in the embodiments of FIGS. 10 and 11 according to the first embodiment of the present disclosure.
Figure 13:
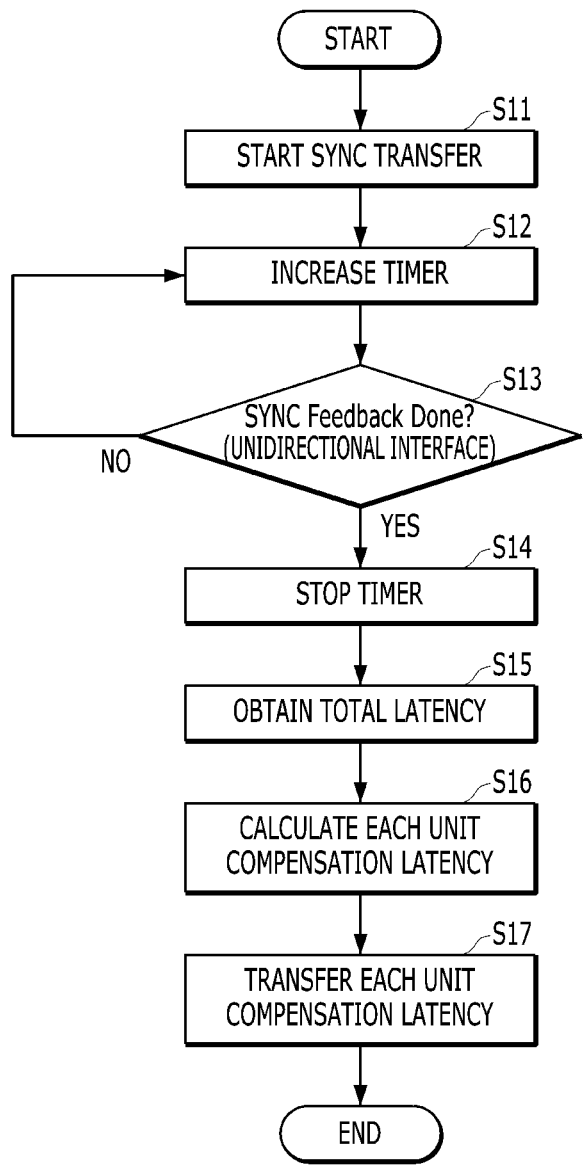
FIG. 13 is a diagram illustrating an operation of an output deviation compensation circuit, in the embodiments of FIGS. 10 and 11 according to the first embodiment of the present disclosure.

FIG. 11 is a diagram illustrating an example where the output deviation compensation circuit according to the first embodiment of the present disclosure is embedded into a first display unit and receives, through feedback, a synchronization signal from a last display unit connected to a unidirectional interface circuit.

In an infinitely expandable display apparatus of FIG. 11, a plurality of display units may be connected to one another by using the unidirectional communication scheme based on the cascading scheme, and a set board may be connected to a first display unit 1 through a set interface circuit. A transfer data packet (including image data and a transfer start synchronization signal SYNC) transferred from the set board through the set interface circuit may be sequentially transferred and delayed in a first transfer direction based on a cascading order up to a sixteenth display unit 16 from a first display unit 1. In FIG. 11, serial numbers for differentiating the display units may represent a reception order of transfer data packets. The last display unit 16 may feed back a feedback synchronization signal SYNC, in which total latency is reflected, to the first display unit 1 through a set interface circuit.

An output deviation compensation circuit including the measurement unit, the calculation unit, and the transfer unit may be embedded into a first display unit. The transfer unit of the display unit 1 may transfer the transfer start synchronization signal SYNC to a second display unit 2 through the unidirectional interface circuit. The measurement unit of the display unit 1 may receive, through feedback, the feedback synchronization signal SYNC from the last display unit 16 through the unidirectional interface circuit. The measurement unit of the display unit 1 may calculate, as total latency, a time difference between the transfer start synchronization signal SYNC and the feedback synchronization signal SYNC as in FIG. 12. To this end, the measurement unit of the display unit 1 may include a timer as in FIG. 13 and may operate the timer in synchronization with an output of the transfer start synchronization signal SYNC (S11 and S12). The measurement unit may increase a count value of the timer until the feedback synchronization signal SYNC is received and may stop an operation of the timer when the feedback synchronization signal SYNC is received (S13 and S14). The measurement unit may calculate, as total latency, a count value until the feedback synchronization signal SYNC is received (S15). Here, the transfer start synchronization signal SYNC and the feedback synchronization signal SYNC may each be a vertical synchronization signal associated with image data, or may be a data enable signal associated with the image data. Then, as in FIG. 13, the calculation unit of the display unit 1 may calculate compensation latency by units of one display unit on the basis of the total latency (S16). Also, as in FIG. 13, the transfer unit of the display unit 1 may transfer a transfer data packet, including the compensation latency, to the second display unit 2 through the unidirectional interface circuit in a first transfer direction (S17).

The display units 1 to 16 may store unit image data in a memory on the basis of default latency until display unit-based compensation latency is received as in FIG. 14 (S21). When the display unit-based compensation latency is received as in FIG. 14, the display units 1 to 16 may apply the display unit-based compensation latency to control an image output (S22, S23, and S24). In other words, the display units 1 to 16 may read out the unit image data from the memory on the basis of the display unit-based compensation latency and may apply the unit image data to the display panel.

Figure 15:
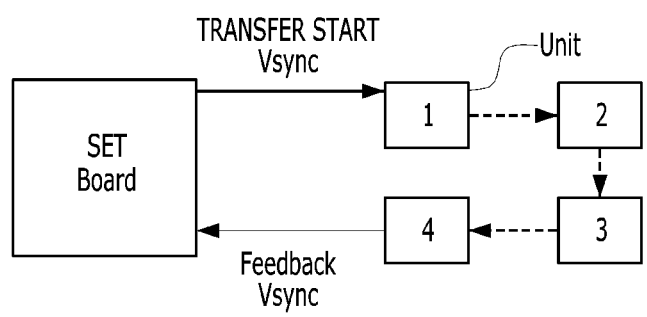
FIGS. 15 and 16 are diagrams a detailed example where compensation latency is differently calculated for each display unit so that output times of display units are synchronized, in the output deviation compensation circuit illustrated in FIG. 10 according to the first embodiment of the present disclosure.
Figure 15:
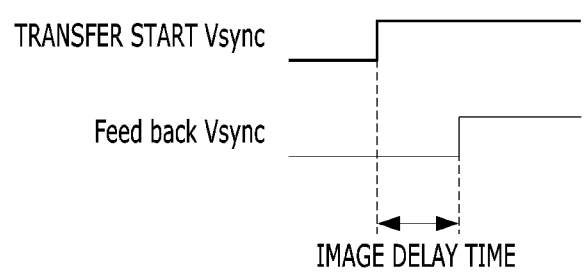
Figure 16:
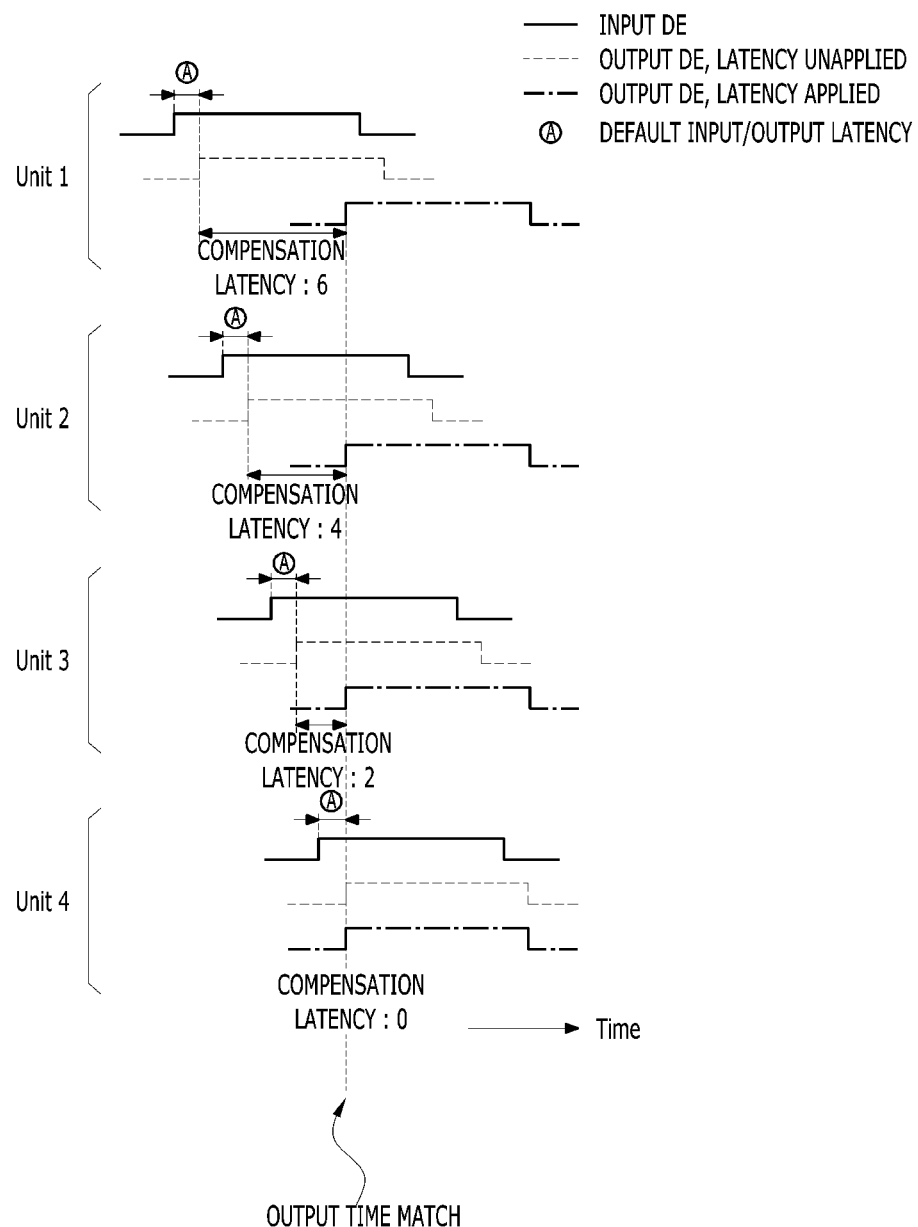
Figure 17:
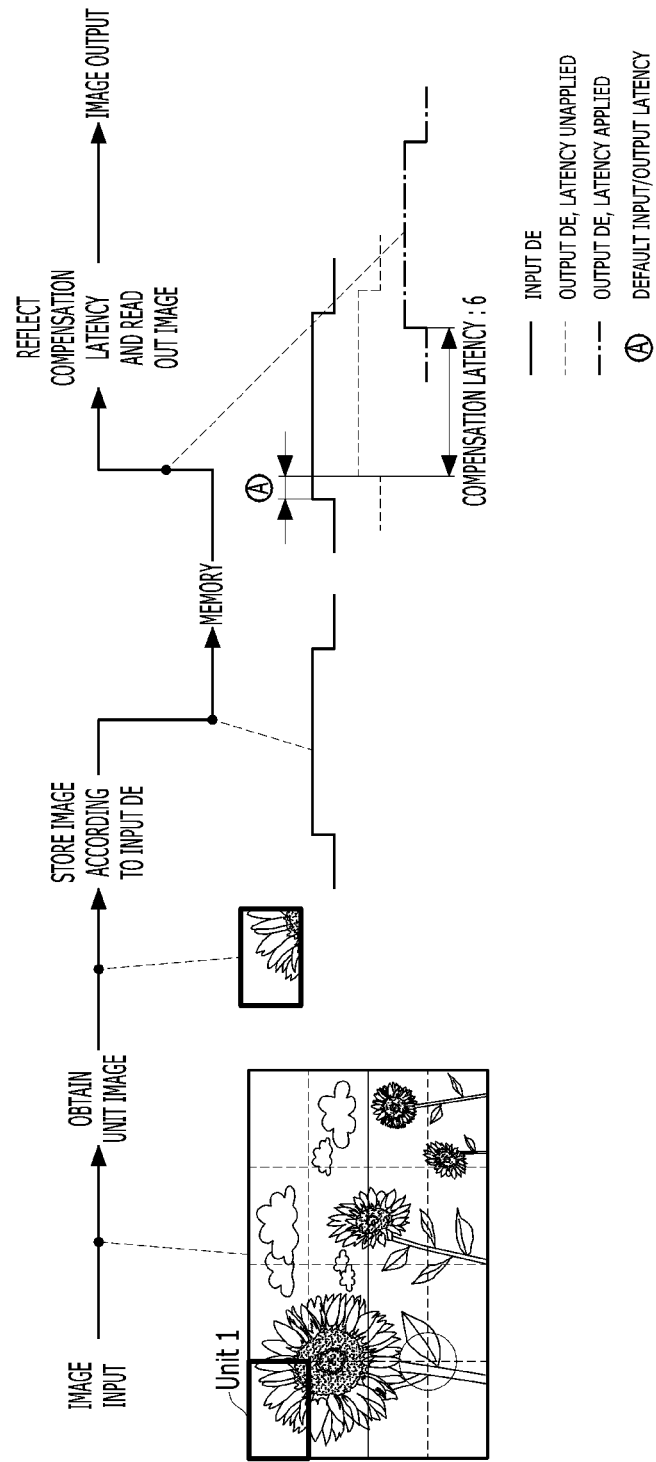
FIG. 17 is a diagram for describing the principle that an image output of a first display unit is controlled based on the compensation latency calculated in FIG. 16 according to the first embodiment of the present disclosure.

FIGS. 15 and 16 are diagrams a detailed example where compensation latency is differently calculated for each display unit so that output times of display units are synchronized, in the output deviation compensation circuit illustrated in FIG. 10 according to the first embodiment. Also, FIG. 17 is a diagram for describing the principle that an image output of a first display unit is controlled based on the compensation latency calculated in FIG. 16 according to the first embodiment.

In FIGS. 15 and 16, for convenience of description, it may be assumed that a cabinet is configured with a plurality of display units 1 to 4 and an output deviation compensation circuit is embedded into a set board. Also, it may be assumed that each of a transfer start synchronization signal SYNC and a feedback synchronization signal SYNC is a vertical synchronization signal Vsync and total latency is 10.

A calculation unit of the output deviation compensation circuit may calculate display unit-based compensation latency for compensating for an output deviation between the display units by using the following Equation 1.

$$\text{unit latency } (i) = \left(\frac{\text{total latency}}{n+1}\right) \times (n-i) \qquad [\text{Equation 1}]$$

$n$ = number of total unit, $i$ = unit number

Therefore, first compensation latency of a display unit 1 may be $\{10/(4+1)\}*(4-1)=6$, second compensation latency of a display unit 2 may be $\{10/(4+1)\}*(4-2)=4$, third compensation latency of a display unit 3 may be $\{10/(4+1)\}*(4-3)=2$, and fourth compensation latency of a display unit 4 may be $\{10/(4+1)\}*(4-4)=0$.

The display units 1 to 4 may differently adjust an output data enable signal DE on the basis of the first to fourth compensation latencies, respectively, and then, may read unit image data from a memory on the basis of the adjusted output data enable signal DE and may apply the unit image data to the display panel to allow image output times thereof to match therebetween.

For example, as in FIG. 17, when image data is received, the display unit 1 may obtain unit image data allocated thereto and may store the unit image data in the memory on the basis of an input data enable signal DE designated based on the transfer start synchronization signal SYNC. Also, when the first compensation latency is received from the output deviation compensation circuit, the display unit 1 may adjust the output data enable signal DE on the basis of the first compensation latency, read the unit image data from the memory on the basis of the adjusted output data enable signal DE, and apply the unit data image to the display panel.

Figure 18:
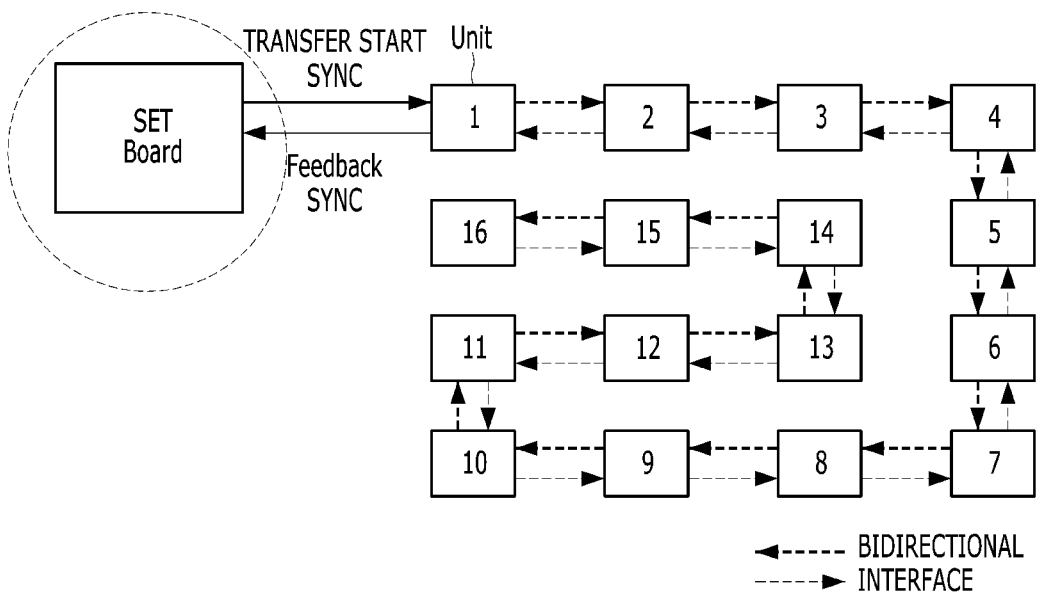
FIG. 18 is a diagram illustrating an example where the output deviation compensation circuit is embedded into a set board and receives, through feedback, a synchronization signal from a first display unit connected to a bidirectional interface circuit according to the first embodiment of the present disclosure.

FIG. 18 is a diagram illustrating an example where the output deviation compensation circuit is embedded into a set board and receives, through feedback, a synchronization signal from a first display unit connected to a bidirectional interface circuit according to the first embodiment of the present disclosure.

In an infinitely expandable display apparatus of FIG. 18, a plurality of display units may be connected to one another by using a bidirectional communication scheme based on the cascading scheme. A transfer data packet (including image data and a transfer start synchronization signal SYNC) transferred from a set board through a set interface circuit may be sequentially transferred and delayed in a second transfer direction (which is opposite to the first transfer direction) based on a cascading order up to a display unit 16 from a display unit 1. According to the bidirectional communication scheme in the first transfer direction and the second transfer direction, the first display unit 1 may be a first display unit, a display unit 2 may be a second display unit, and the last display unit 16 may be a last display unit. In FIG. 18, serial numbers for differentiating the display units may represent a reception order of transfer data packets in the first direction. The first display unit 1 may receive a feedback synchronization signal SYNC in which total latency is reflected and may feed back the feedback synchronization signal SYNC to the set board through the set interface circuit. Here, because the feedback synchronization signal SYNC returns to the first display unit 1 in the second transfer direction and is fed back to the set board, a return time which is two times the total latency may be reflected in the feedback synchronization signal SYNC.

According to such a bidirectional communication scheme, each display unit may include two signal reception terminals (see RX and RX1 of FIG. 6) and two signal transfer terminals (see TX and TXF1 of FIG. 6). When a communication interface between display units is implemented as a short-distance wireless communication scheme, the bidirectional interface circuit may be simplified, and convenience of screen expansion may increase. The short-distance wireless communication scheme may be implemented as an infrared scheme, but the present embodiment is not limited thereto.

The first display unit 1 based on a cascading order may be disposed closer to the set board than the other display units, for an effective communication connection with the set board.

The set board is connected to the first display unit 1 and the last display unit 16 through the set interface circuit. An output deviation compensation circuit including the measurement unit, the calculation unit, and the transfer unit may be embedded into the set board. The transfer unit of the set board may transfer the transfer start synchronization signal SYNC to the first display unit 1 through a first communication line included in the set interface circuit. The transfer unit of the set board may transfer the transfer start synchronization signal SYNC to the first display unit 1 through a first communication line included in the set interface circuit. The display unit 1 may transfer the transfer start synchronization signal SYNC to the second display unit 2 through a bidirectional interface circuit in a first transfer direction. Also, the display unit 1 may receive the feedback synchronization signal SYNC from the second display unit 2 through a bidirectional interface circuit in a second transfer direction.

The measurement unit of the set board may receive the feedback synchronization signal SYNC from the first display unit 1 through a second communication line included in the set interface circuit. The measurement unit of the set board may calculate, as 2*total latency (i.e., a return time), a time difference between the transfer start synchronization signal SYNC and the feedback synchronization signal SYNC as in FIG. 20. To this end, the measurement unit of the set board may include a timer as in FIG. 21 and may operate the timer in synchronization with an output of the transfer start synchronization signal SYNC (S31 and S32). The measurement unit may increase a count value of the timer until the feedback synchronization signal SYNC returns and is received and may stop an operation of the timer when the feedback synchronization signal SYNC is received (S33 and S34). The measurement unit may calculate, as 2*total latency, a count value until the feedback synchronization signal SYNC returns and is received (S35). Here, the transfer start synchronization signal SYNC and the feedback synchronization signal SYNC may each be a vertical synchronization signal associated with image data, or may be a data enable signal associated with the image data. Then, as in FIG. 21, the calculation unit of the set board may calculate compensation latency by units of one display unit on the basis of the 2*total latency (i.e., the return time) (S36). Also, as in FIG. 21, the transfer unit of the set board may transfer a transfer data packet, including the compensation latency, to the first display unit 1 through the first communication line of the set interface circuit (S37).

The display units 1 to 16 may store unit image data in a memory on the basis of default latency until display unit-based compensation latency is received as in FIG. 14 (S21). When the display unit-based compensation latency is received as in FIG. 14, the display units 1 to 16 may apply the display unit-based compensation latency to control an image output (S22, S23, and S24). In other words, the display units 1 to 16 may read out the unit image data from the memory on the basis of the display unit-based compensation latency and may apply the unit image data to the display panel.

The set interface circuit may be implemented to be wired or wireless. When a separation distance between the set board and the cabinet is short, the set board and the cabinet may be connected to each other through a wireless interface circuit instead of a wired communication cable. Because the second communication line and the unidirectional interface circuit connecting display units configure a feedback loop line, closed loop control may be implemented with only an interface which is simple and is low in cost.

A set interface circuit and a bidirectional interface circuit may be implemented based on a V-by-One (V×1) scheme capable of high-speed and large-capacity interfacing, but are not limited thereto.

Figure 19:
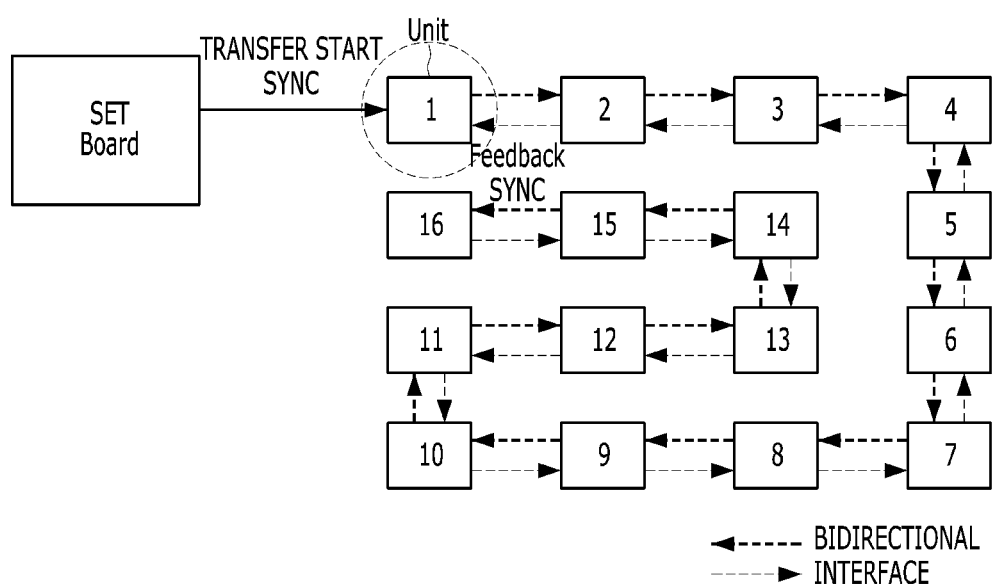
FIG. 19 is a diagram illustrating an example where the output deviation compensation circuit is embedded into a first display unit and receives, through feedback, a synchronization signal from a second display unit connected to a bidirectional interface circuit according to the first embodiment of the present disclosure.
Figure 20:
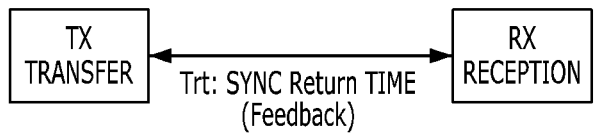
FIG. 20 is a diagram illustrating an example where an image delay time is reflected in a synchronization signal return time and is fed back, in the embodiments of FIGS. 18 and 19 according to the first embodiment of the present disclosure.
Figure 21:
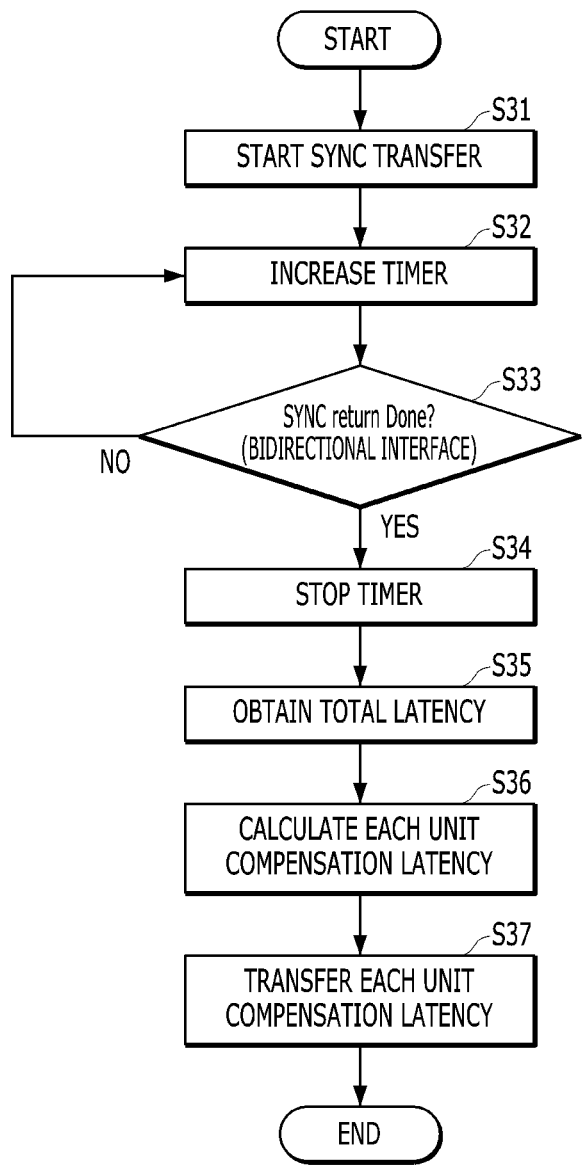
FIG. 21 is a diagram illustrating an operation of an output deviation compensation circuit, in the embodiments of FIGS. 18 and 19 according to the first embodiment of the present disclosure.

FIG. 19 is a diagram illustrating an example where the output deviation compensation circuit according to the first embodiment of the present disclosure is embedded into a first display unit and receives, through feedback, a synchronization signal from a second display unit connected to a bidirectional interface circuit.

In an infinitely expandable display apparatus of FIG. 19, a plurality of display units may be connected to one another by using the bidirectional communication scheme based on the cascading scheme, and a set board may be connected to a first display unit 1 through a set interface circuit. A transfer data packet (including image data and a transfer start synchronization signal SYNC) transferred from the set board through the set interface circuit may be sequentially transferred and delayed in a first transfer direction based on a cascading order up to the display unit 16 from the display unit 1 and may be sequentially transferred and delayed in a second transfer direction (which is opposite to the first transfer direction) based on a cascading order up to the display unit 1 from the display unit 16. According to the bidirectional communication scheme in the first transfer direction and the second transfer direction, the first display unit 1 may be a first display unit, a display unit 2 may be a second display unit, and the last display unit 16 may be a last display unit. In FIG. 19, serial numbers for differentiating the display units may represent a reception order of transfer data packets in the first direction. The first display unit 1 may receive a feedback synchronization signal SYNC in which total latency is reflected. Here, because the feedback synchronization signal SYNC returns to the first display unit 1 in the second transfer direction, 2*total latency may be reflected in the feedback synchronization signal SYNC.

An output deviation compensation circuit including the measurement unit, the calculation unit, and the transfer unit may be embedded into the first display unit 1. The transfer unit of the display unit 1 may transfer the transfer start synchronization signal SYNC to the second display unit 2 through a bidirectional interface circuit in a first transfer direction. The measurement unit of the display unit 1 may receive, through feedback (return), the feedback synchronization signal SYNC to the second display unit 2 through a bidirectional interface circuit in a second transfer direction. The measurement unit of the display unit 1 may calculate, as 2*total latency (i.e., a return time), a time difference between the transfer start synchronization signal SYNC and the feedback synchronization signal SYNC as in FIG. 20. To this end, the measurement unit of the display unit 1 may include a timer as in FIG. 21 and may operate the timer in synchronization with an output of the transfer start synchronization signal SYNC (S31 and S32). The measurement unit may increase a count value of the timer until the feedback synchronization signal SYNC returns and is received and may stop an operation of the timer when the feedback synchronization signal SYNC is received (S33 and S34). The measurement unit may calculate, as 2*total latency (i.e., a return time), a count value until the feedback synchronization signal SYNC returns and is received (S35). Here, the transfer start synchronization signal SYNC and the feedback synchronization signal SYNC may each be a vertical synchronization signal associated with image data, or may be a data enable signal associated with the image data. Then, as in FIG. 21, the calculation unit of the display unit 1 may calculate compensation latency by units of one display unit on the basis of the 2*total latency (i.e., the return time) (S36). Also, as in FIG. 21, the transfer unit of the display unit 1 may transfer a transfer data packet, including the compensation latency, to the second display unit 2 through the bidirectional interface circuit in the first transfer direction (S37).

The display units 1 to 16 may store unit image data in a memory on the basis of default latency until display unit-based compensation latency is received as in FIG. 14 (S21). When the display unit-based compensation latency is received as in FIG. 14, the display units 1 to 16 may apply the display unit-based compensation latency to control an image output (S22, S23, and S24). In other words, the display units 1 to 16 may read out the unit image data from the memory on the basis of the display unit-based compensation latency and may apply the unit image data to the display panel.

Figure 22:
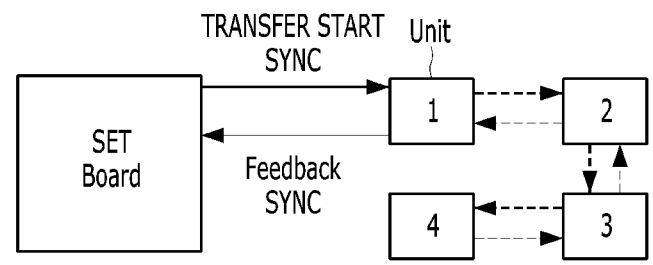
FIGS. 22 and 23 are diagrams a detailed example where compensation latency is differently calculated for each display unit so that output times of display units are synchronized, in the output deviation compensation circuit illustrated in FIG. 18 according to the first embodiment of the present disclosure.
Figure 22:
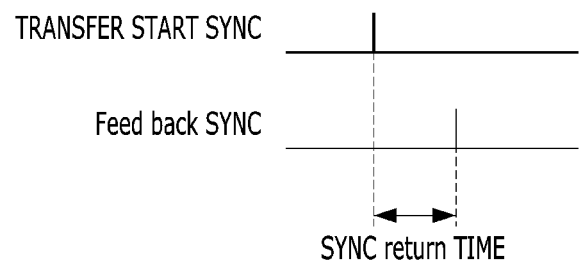
Figure 23:
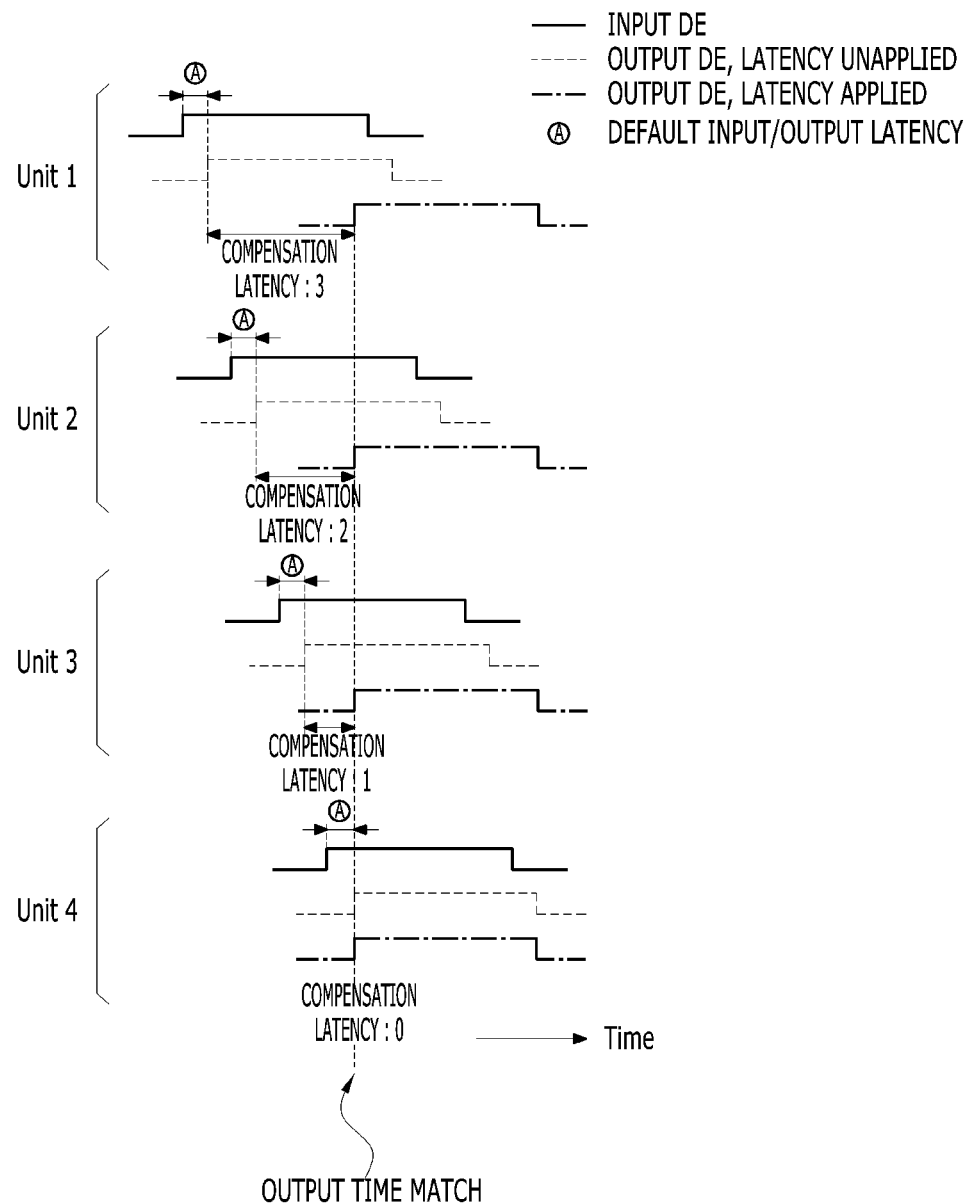

FIGS. 22 and 23 are diagrams a detailed example where compensation latency is differently calculated for each display unit so that output times of display units are synchronized, in the output deviation compensation circuit illustrated in FIG. 18 according to one embodiment.

In FIGS. 22 and 23, for convenience of description, it may be assumed that a cabinet is configured with a plurality of display units 1 to 4 and an output deviation compensation circuit is embedded into a set board. Also, it may be assumed that each of a transfer start synchronization signal SYNC and a feedback synchronization signal SYNC is a vertical synchronization signal Vsync and 2*total latency (i.e., a return time) is 8.

A calculation unit of an output deviation compensation circuit may calculate display unit-based compensation latency for compensating for an output deviation between display units by using the following Equation 2.

$$\text{unit latency}(i) = (\text{Return Time}/2n) \times (n-i) \quad [\text{Equation 2}]$$

n=number of total units, i=unit number

Therefore, first compensation latency of a display unit 1 may be {8/(2*4)}*(4−1)=3, second compensation latency of a display unit 2 may be {8/(2*4)}*(4−2)=2, third compensation latency of a display unit 3 may be {8/(2*4)}*(4−3)=1, and fourth compensation latency of a display unit 4 may be {8/(2*4)}*(4−4)=0.

The display units 1 to 4 may differently adjust an output data enable signal DE on the basis of the first to fourth compensation latencies, respectively, and then, may read unit image data from a memory on the basis of the adjusted output data enable signal DE and may apply the unit image data to the display panel to allow image output times thereof to match therebetween.

For example, as in FIG. 17, when image data is received, the display unit 1 may obtain unit image data allocated thereto and may store the unit image data in the memory on the basis of an input data enable signal DE designated based on the transfer start synchronization signal SYNC. Also, when the first compensation latency is received from the output deviation compensation circuit, the display unit 1 may adjust the output data enable signal DE on the basis of the first compensation latency, read the unit image data from the memory on the basis of the adjusted output data enable signal DE, and apply the unit data image to the display panel.

Figure 24:
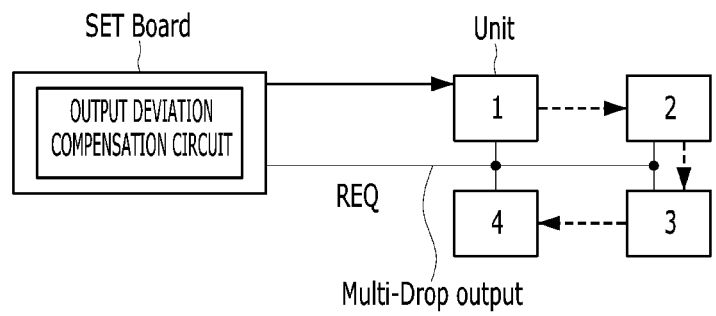
FIG. 24 is a diagram for describing an output deviation compensation circuit according to a second embodiment of the present disclosure.

FIG. 24 is a diagram for describing an output deviation compensation circuit according to a second embodiment of the present disclosure. Also, FIGS. 25 and 26 are diagrams illustrating a detailed example where an output multi-drop synchronization signal is generated so that output times of display units are synchronized, in the output deviation compensation circuit according to the second embodiment of the present disclosure.

Referring to FIG. 24, an output deviation compensation circuit may be embedded into a set board and a plurality of display units may be connected to one another through a unidirectional interface circuit, but the inventive concept is not limited thereto. The output deviation compensation circuit may be embedded into a first display unit 1 based on a cascading communication scheme. Also, the display units may be connected to one another through a bidirectional interface circuit.

The output deviation compensation circuit may be a deviation compensation circuit and may generate a predetermined multi-drop synchronization signal REQ and may transfer the multi-drop synchronization signal REQ to display units 1 to 4 through a control signal line SL which is independent of an interface circuit based on the cascading scheme. The plurality of display units 1 to 4 are connected to the control signal line SL in parallel, and thus, the display units 1 to 4 may simultaneously receive the multi-drop synchronization signal REQ.

Figure 25:
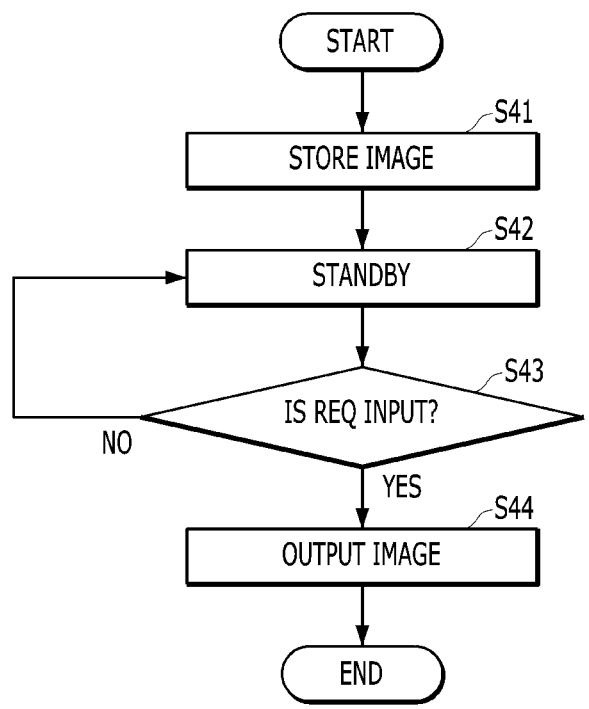
FIGS. 25 and 26 are diagrams illustrating a detailed example where an output multi-drop synchronization signal is generated so that output times of display units are synchronized, in the output deviation compensation circuit according to the second embodiment of the present disclosure.
Figure 26:
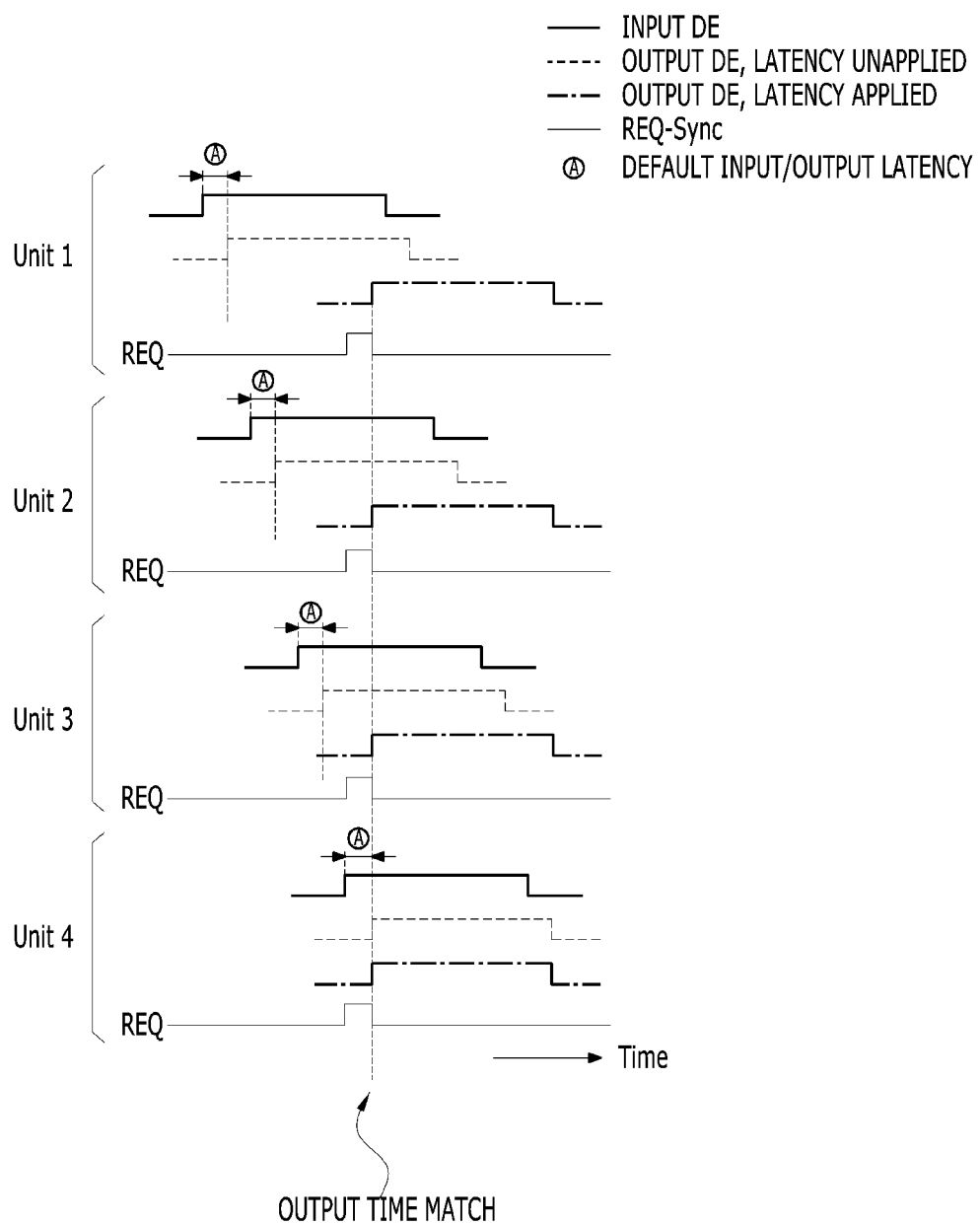

When image data is sequentially received through the interface circuit based on the cascading scheme as in FIGS. 25 and 26, the display units 1 to 4 may store the received image data in a memory on the basis of an input data enable signal DE, and then, may maintain a corresponding storage state until the multi-drop synchronization signal REQ is received (S41 and S42).

When the multi-drop synchronization signal REQ is simultaneously received, each of the display units 1 to 4 may identically adjust an output data enable signal DE on the basis of the multi-drop synchronization signal REQ, and then, may read unit image data from the memory on the basis of the adjusted output data enable signal DE and may apply the unit image data to the display panel, thereby allowing image output times to match therebetween.

Figure 27:
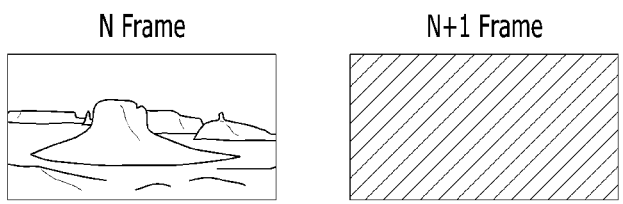
FIGS. 27 and 28 are diagrams showing results obtained by comparing display images implemented by display units before and after compensating for output latency, when an image is rapidly changed through two frames.
Figure 28:
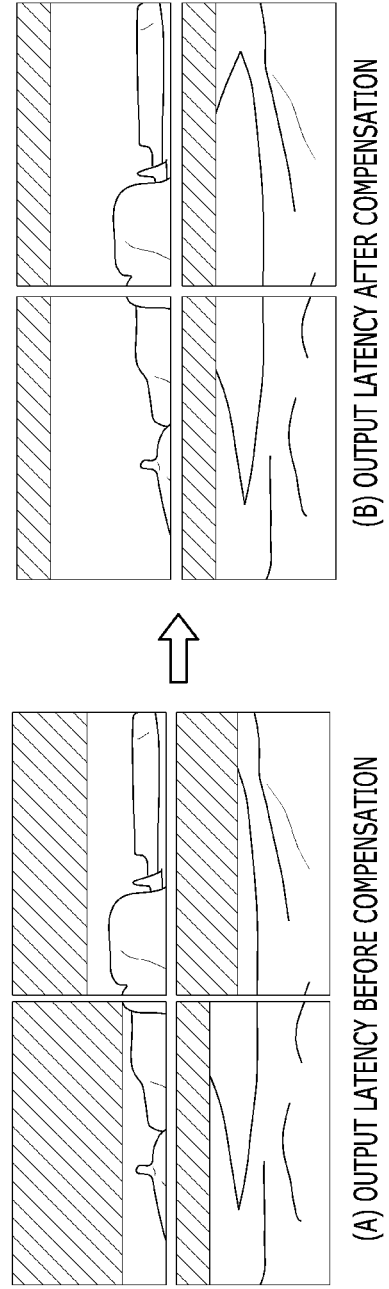

FIGS. 27 and 28 are diagrams showing results obtained by comparing display images implemented by display units before and after compensating for output latency, when an image is rapidly changed through two frames.

As in FIG. 27, in a case where image data is rapidly changed in an $N^{th}$ frame and an $N+1^{th}$ frame, when an output time of image data matches between display units which sequentially receive image data on the basis of the cascading scheme (see (B) in FIG. 28), an image quality defect caused by output desynchronization may be considerably reduced compared to a case where an output time of image data does not match (see (A) in FIG. 28).

The present embodiment may realize the following effects.

In the infinitely expandable display apparatus according to the embodiments of the present disclosure, an output time of image data may match between display units which sequentially receive image data on the basis of the cascading scheme, and thus, an image quality defect caused by output desynchronization may be considerably reduced.

The infinitely expandable display apparatus according to the embodiments of the present disclosure may obtain image signal delay information by using a feedback loop and may adjust the input/output latency of each display unit by using the obtained delay information.

The infinitely expandable display apparatus according to the embodiments of the present disclosure may implement an output synchronization function by using the feedback loop, thereby enhancing image quality without an increase in cost.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. An expandable display apparatus comprising:
a set board outputting image data;
a plurality of display devices connected to one another through an interface circuit based on a cascading scheme to sequentially receive the image data; and
an output deviation compensation circuit generating a deviation compensation signal that allows the image data to be simultaneously output from the plurality of display devices, and transferring the deviation compensation signal to the plurality of display devices,
wherein the output deviation compensation circuit is connected to one of the plurality of display devices through a feedback loop, and receives a synchronization signal, in which a total latency of each of the plurality of display devices is reflected, through the feedback loop.

2. The expandable display apparatus of claim 1, wherein each of the plurality of display devices stores unit image data, allocated thereto, of the image data in a memory, reads the unit image data stored in the memory based on the deviation compensation signal, and applies the unit image data to a display panel.

3. The expandable display apparatus of claim 1, wherein the interface circuit is based on a short-distance wireless communication scheme.

4. The expandable display apparatus of claim 1, wherein the output deviation compensation circuit comprises:
a measurement circuit calculating the total latency based on the synchronization signal;
a calculation circuit calculating, as the deviation compensation signal, display unit-based compensation latency for compensating for an output deviation between the plurality of display devices based on the total latency; and
a transfer circuit transferring the display unit-based compensation latency to the plurality of display devices through the interface circuit based on the cascading scheme.

5. The expandable display apparatus of claim 4, wherein the compensation latency is different for each of the plurality of display devices.

6. The expandable display apparatus of claim 4, wherein the synchronization signal comprises one of a vertical synchronization signal associated with the image data or a data enable signal associated with the image data.

7. The expandable display apparatus of claim 4, wherein the output deviation compensation circuit is embedded into the set board.

8. The expandable display apparatus of claim 7, wherein the interface circuit is a unidirectional interface circuit, and
the measurement circuit receives, through feedback, the synchronization signal from a last display device from the plurality of display devices based on the cascading scheme.

9. The expandable display apparatus of claim 7, wherein the interface circuit is a bidirectional interface circuit, and the measurement circuit receives, through feedback, the synchronization signal from a first display device from the plurality of display devices based on the cascading scheme.

10. The expandable display apparatus of claim 4, wherein the output deviation compensation circuit is embedded into a first display device from the plurality of display devices based on the cascading scheme.

11. The expandable display apparatus of claim 10, wherein
the interface circuit is a bidirectional interface circuit, and
the measurement circuit receives, through feedback, the synchronization signal from a second display device from the plurality of display devices based on the cascading scheme.

12. The expandable display apparatus of claim 1, wherein the output deviation compensation circuit generates a multi-drop synchronization signal as the deviation compensation signal and simultaneously transfers the multi-drop synchronization signal to the plurality of display devices through a control signal line, and
wherein the control signal line is independent of the interface circuit based on the cascading scheme.

13. The expandable display apparatus of claim 12, wherein
the plurality of display devices are connected to the control signal line in parallel, and
the plurality of display devices receive the multi-drop synchronization signal simultaneously.

14. A driving method of an expandable display apparatus, the driving method comprising:
outputting image data by using a set board;
sequentially receiving the image data by using a plurality of display devices connected to one another through an interface circuit based on a cascading scheme;
generating a deviation compensation signal and transferring the deviation compensation signal to the plurality of display devices by using an output deviation compensation circuit; and
simultaneously outputting the image data received from the plurality of display devices based on the deviation compensation signal,
wherein generating the deviation compensation signal comprises receiving a synchronization signal, in which a total latency of each of the plurality of display devices is reflected, from one of the plurality of display devices through a feedback loop.

15. The driving method of claim 14, further comprising storing unit image data, allocated thereto, of the image data in a memory by using each of the plurality of display devices,
wherein simultaneously outputting the image data comprises reading the unit image data stored in the memory based on the deviation compensation signal and applying the unit image data to a display panel.

16. The driving method of claim 14, wherein generating the deviation compensation signal further comprises:
calculating the total latency based on the synchronization signal;
calculating, as the deviation compensation signal, display unit-based compensation latency for compensating for an output deviation between the plurality of display devices on based on the total latency; and
transferring the display unit-based compensation latency to the plurality of display devices through the interface circuit based on the cascading scheme.

17. The driving method of claim 16, wherein the compensation latency is different for each of the plurality of display devices.

18. The driving method of claim 16, wherein the synchronization signal comprises one of a vertical synchronization signal associated with the image data or a data enable signal associated with the image data.

19. The driving method of claim 14, wherein the generating of the deviation compensation signal comprises generating a multi-drop synchronization signal as the deviation compensation signal and simultaneously transferring the multi-drop synchronization signal to the plurality of display devices through a control signal line, and wherein the control signal line is independent of the interface circuit based on the cascading scheme.

20. The driving method of claim 14, wherein the interface circuit is a unidirectional interface circuit or a bidirectional interface circuit.

* * * * *